July 21, 1964

L. E. COSTE 3,141,965

SERIAL ADDER USING ALGEBRAIC QUINARY NOTATION

Filed Aug. 25, 1959

July 21, 1964   L. E. COSTE   3,141,965
SERIAL ADDER USING ALGEBRAIC QUINARY NOTATION
Filed Aug. 25, 1959   10 Sheets-Sheet 4

July 21, 1964  L. E. COSTE  3,141,965
SERIAL ADDER USING ALGEBRAIC QUINARY NOTATION
Filed Aug. 25, 1959  10 Sheets-Sheet 6

July 21, 1964 L. E. COSTE 3,141,965
SERIAL ADDER USING ALGEBRAIC QUINARY NOTATION
Filed Aug. 25, 1959 10 Sheets-Sheet 7

July 21, 1964     L. E. COSTE     3,141,965
SERIAL ADDER USING ALGEBRAIC QUINARY NOTATION
Filed Aug. 25, 1959     10 Sheets-Sheet 8

United States Patent Office 3,141,965
Patented July 21, 1964

3,141,965
SERIAL ADDER USING ALGEBRAIC
QUINARY NOTATION
Louis Etienne Coste, 12 Rue du Pere Mazurie,
Chevilly, Seine, France
Filed Aug. 25, 1959, Ser. No. 836,019
Claims priority, application France Sept. 5, 1958
4 Claims. (Cl. 235—176)

This invention sets out to provide improved systems for digital computation. The invention is based primarily upon the use of a particular system of numeration, the so-called "algebraic quinary" system, as this expression will be fully defined hereinbelow. The use of the algebraic quinary system in combination with the usual binary system for effecting arithmetic operations within the circuits of a digital computer presents certain distinct advantages whereby the internal circuitry of the machine can be considerably simplified, as will appear. Also, the specified system of notation lends itself to comparatively easy conversion from and into the decimal system, whereby data input and output operations are facilitated.

Objects of this invention, therefore, can be said to lie chiefly in the provision of digital computer apparatus operating in accordance with the algebraic quinary system of numeration; the provision of such apparatus including storage means, adder and/or multiplier operators based on the algebraic quinary numeration principle; and the provision of such apparatus including decimal-to-algebraic quinary and/or algebraic-quinary-to-decimal input and output means, respectively, whereby information input and output can be effected in the commonplace, easily comprehensible decimal system accessible to any untrained operator.

What is meant by the algebraic quinary numeration system will first be defined.

In a paper to the French Academy of Sciences dated November 16, 1840, the mathematician A. Cauchy described a system of arithmetical notation derived from the decimal system as follows. The digits 0 through 4 of the decimal system are retained unchanged. The digits 5 through 9 are each replaced by their respective tens complement associated with the minus and a unit of the next higher order. Thus 5 is represented by 1$\underline{5}$; 6 by 1$\underline{4}$, and so on, the minus sign being indicated under the related digit for convenience. Thus the system requires six digits and a sign to represent any decimal digit. An important feature of this system is shown to lie in the fact that when a multi-digit decimal number is to be converted to the algebraic quinary notation, the additional tens unit associated with a digit represented by a negative digit in the latter notation carries over to, i.e., combines with, the next higher digit of the number just as in ordinary addition. This carry unit however, can be arranged not to affect the sign of the higher-order digit with which said carry unit combines. This means that in addition to the symbols 0, 1, 2, 3, 4, $\underline{5}$, $\underline{4}$, $\underline{3}$, $\underline{2}$, $\underline{1}$, a number written in algebraic-quinary may further include the symbol $\underline{0}$ (resulting from a carryover towards $\underline{1}$), and the symbol 5 (as resulting from a carry-over towards $\underline{4}$).

For example, a decimal number 19573 would be represented in algebraic-quinary as 2$\underline{0433}$.

Although the algebraic-quinary system was conceived over a century ago, to the best of applicant's knowledge it had not prior to this invention received any practical application. In fact since the relatively recent advent of large-scale digital computer machines Cauchy's work in this particular area does not appear to have attracted the attention of workers in the computer field and the notable and unexpected advantages of the algebraic-quinary system of numeration in connection with digital computer circuitry so far appear to have gone unnoticed.

As will be clearly apparent to those familiar with number theory, the algebraic-quinary system as defined above is completely different from the so-called biquinary system, wherein each decimal digit is coded as a two-digit number including a digit from 0 through 5 a digit 1 or 0 according as the decimal digit under consideration is or is not greater than 4. In the biquinary system the "tens" digit when present does not carry over to the next higher digital order; and as a result, the advantages present in the algebraic quinary system in connection with computer circuitry are absent.

According to the invention, numerical information is represented in binary-coded, algebraic-quinary form. Thus according to an important aspect the invention provides a digital computer adapted for operation on numerical information in the algebraic quinary system, which computer comprises means for representing each information digit as a set of four two-valued electric signals three of which specify a three-digit binary number representing the absolute value from zero through five, and the last of which specifies a binary digit representing the sign, of said information digit as expressed in said algebraic-quinary system.

The above and further objects, aspects and features of the invention will appear from the ensuing disclosure of an exemplary embodiment of the invention illustrated in the accompanying drawings which are chiefly in the form of logical circuit diagrams.

Figure 4:
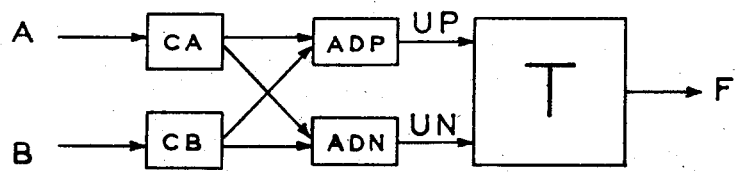
FIG. 4 is a block diagram of an adder operator according to the invention.
Figure 9:
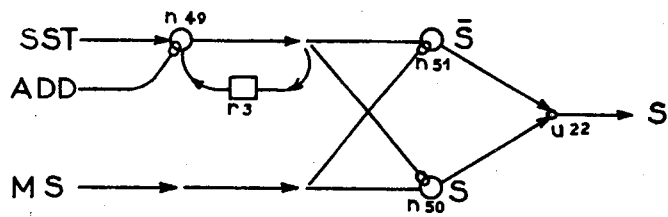
Figure 7:
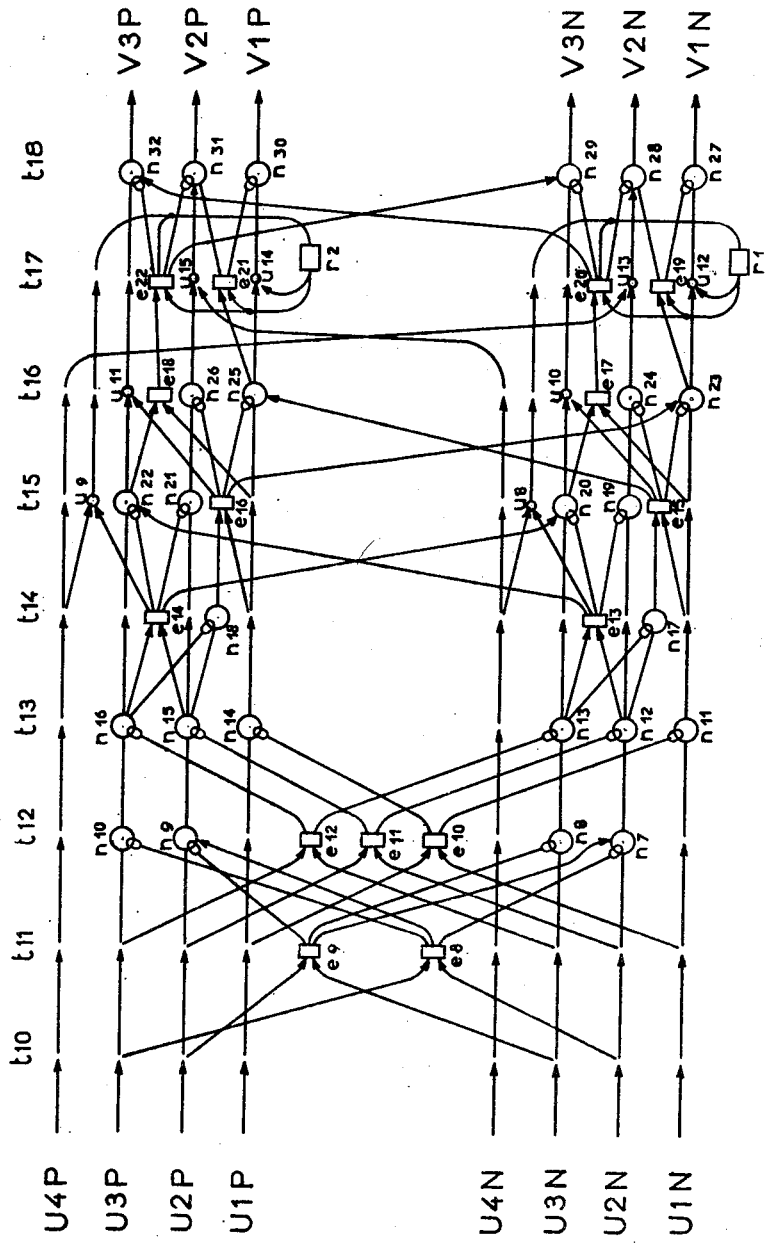
Figure 8:
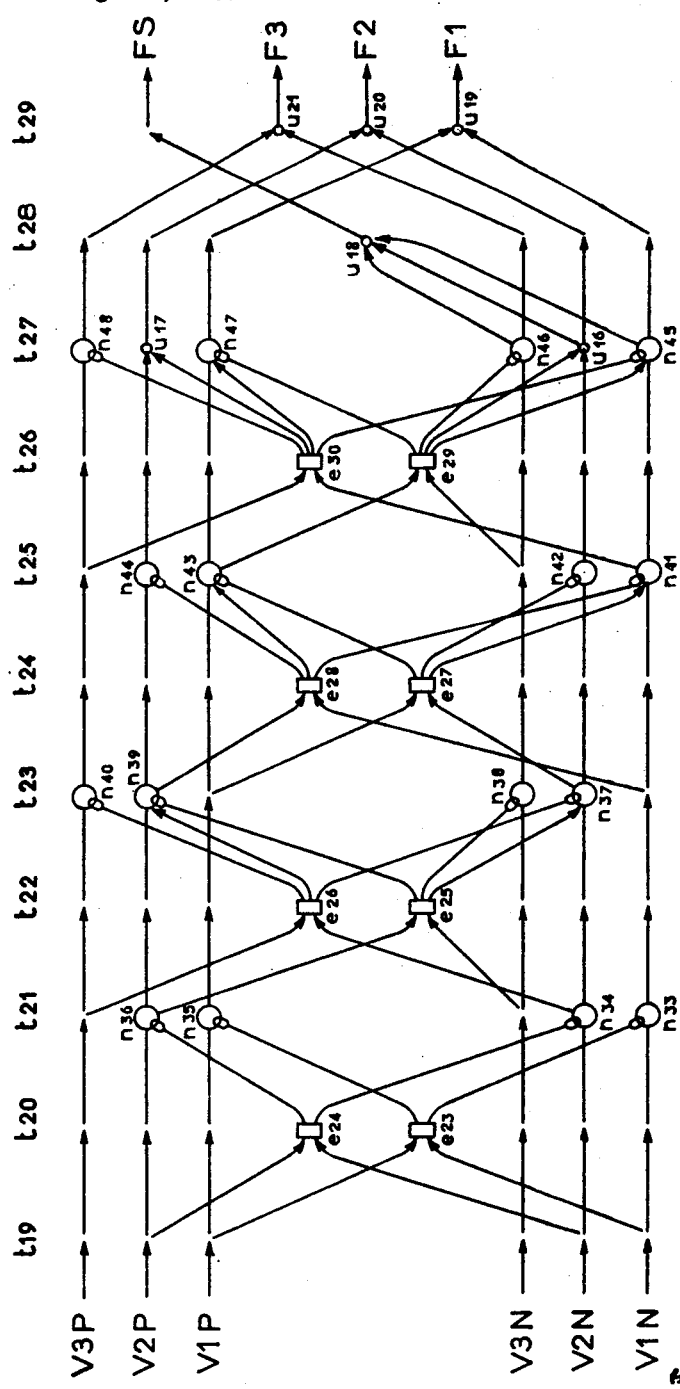
Figure 10:
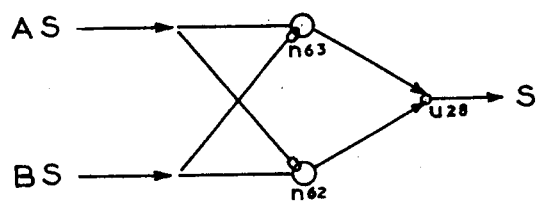

FIGS. 7 and 8, when juxtaposed from left to right in that order illustrate the so-called "transcriber" unit of FIG. 4;

FIG. 9 shows complementing circuitry for changing the sign of each digit as required in subtraction;

FIG. 10 shows a sign-multiplier circuit, and

Figure 12:
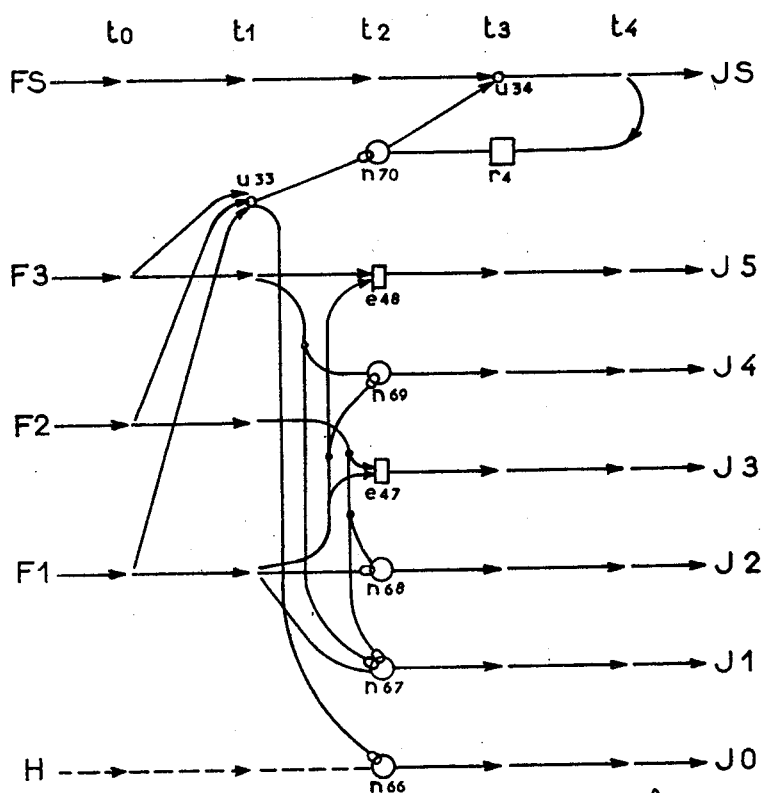
Figure 11:
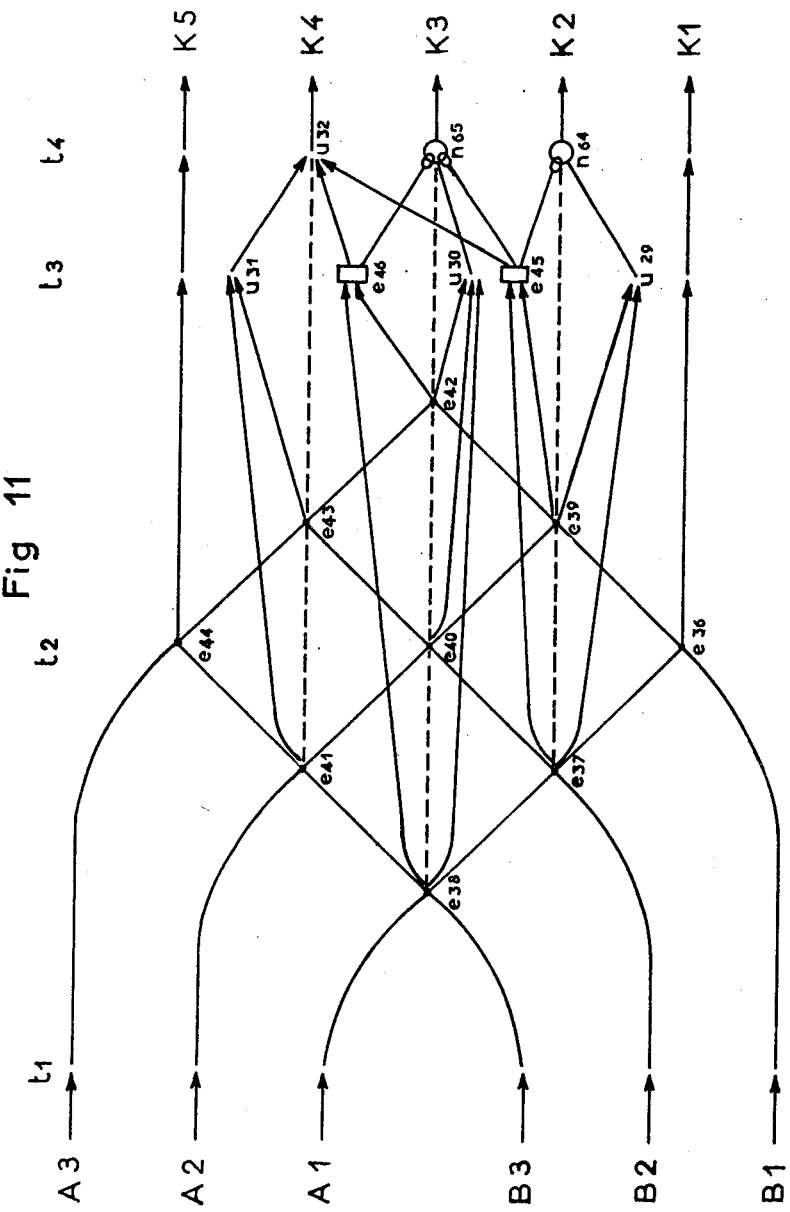

FIG. 11 shows an absolute-value multiplier circuit, which together with the circuit of FIG. 10 comprises a multiplier according to the invention;

FIG. 12 shows an intermediate converter of decoder stage; and

Figure 13:
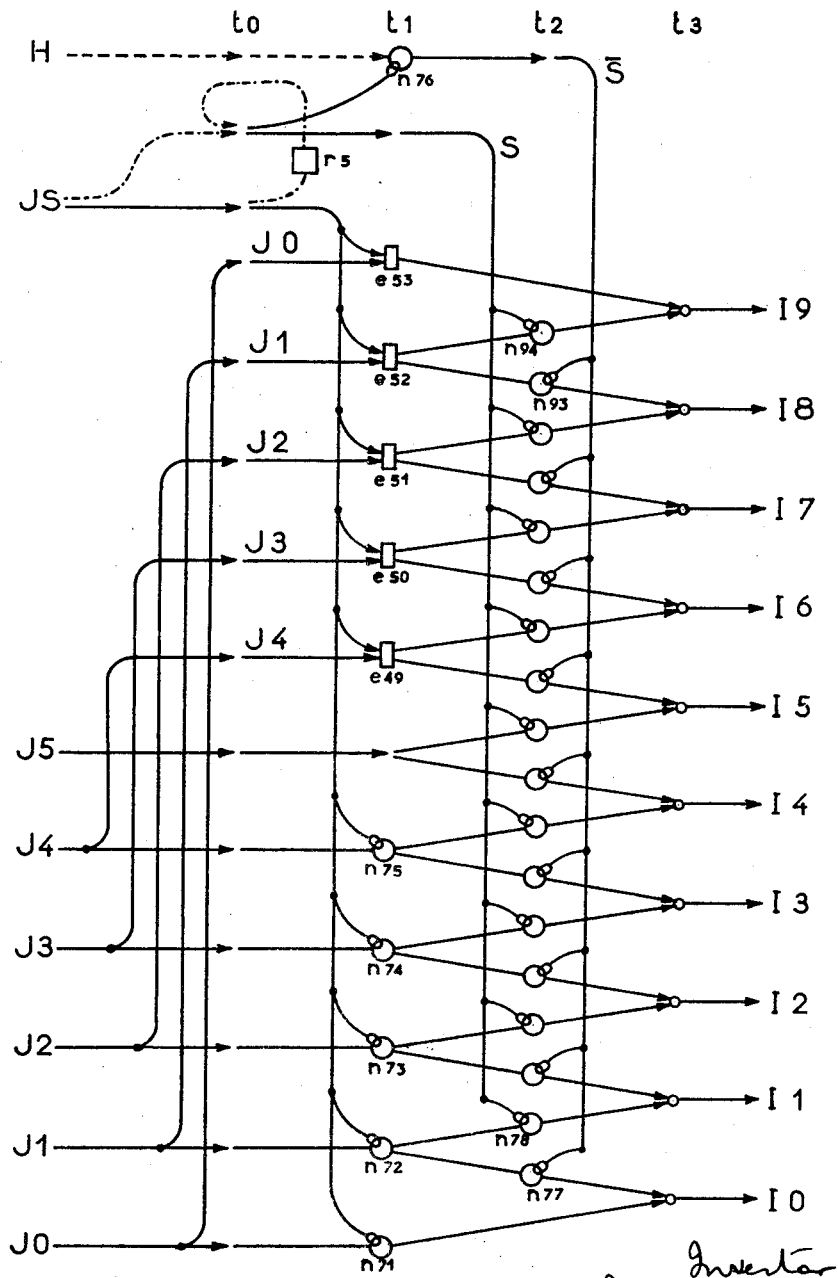

FIG. 13 shows a final stage which together with FIG. 12 comprises an output circuit for converting binary-coded algebraic-quinary information into decimal information on ten output lines.

Figure 1:
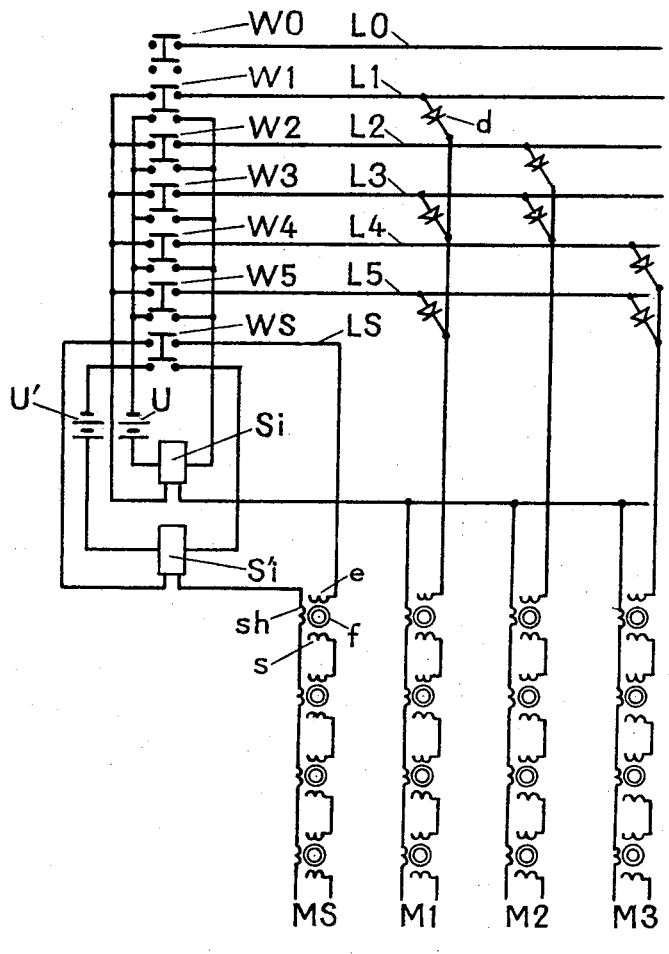
FIG. 1 shows one form of recirculatory storage means according to the invention for storing binary-coded algebraic-quinary numbers, together with input means therefor.

As earlier indicated a decimal digit is represented, in a computer according to the invention, as an algebraic-quinary or "Cauchy" digit having an absolute value from 0 through 5 and a sign. FIG. 1 shows one form of storage means for storing a digit thus represented. The storage means comprise four serial binary registers of the recirculatory type M$s$, M1, M2 and M3; by way of example each register is shown as comprising a plurality of ferrite cores $f$ each provided with an input winding $e$, an output winding $s$ and shifting winding $sh$, the output winding of each core being connected with the input winding to the next. The cores are able to assume two magnetization states respectively representing the binary values 0 and 1. When a uniform train of shift pulses are applied to shift windings $sh$, the binary states of the cores are stepped through the registers in the well-known manner. Clearly registers comprised of two-state elements other than magnetic cores may be used.

Register $Ms$ serves to store the sign of the Cauchy digit. The minus sign is stored as binary value 1, the plus sign as binary value 0, since the plus sign does not require expression according to Cauchy's conversion system as here used.

Registers M1, M2 and M3 serve in combination to store a 3-digit binary number specifying the absolute value from 0 through 5 of the Cauchy digit, in accordance with the conventional binary code as follows:

*Table I*

| Cauchy digit absolute value | Binary state of Register | | |
|---|---|---|---|
| | M1 | M2 | M3 |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |

The input section of the circuit of FIG. 1 does not effect decimal to Cauchy conversion (an input circuit that does effect conversion will later be described in reference to FIGS. 2 and 3). Thus the input circuit of FIG. 1 comprises the six input lines of busses L0, L1, L2, L3, L4, L5 and Ls respectively controlled by way of manually or automatically depressible key W0 to Ws respectively, which comprise an information input keyboard. Each key is associated with an upper and a lower pair of normally open switches the arrangement being such that depression of a key closes the lower switch then the upper switch. The switches associated with key W0 and line L0 are idle. However depression of any one of the keys W1 through W5 acts through the lower switch contacts to complete a circuit from a D.-C. source U to the input of a suitable multivibrator $Si$, so that the latter puts out a voltage pulse. This pulse is applied by way of the upper switch contacts of the depressed key to the related input line L1 . . . L5. Similarly depression of key Ws completes a circuit from source U' to the input of a multivibrator $Si'$ and the output of the latter then applies a pulse to sign input line Ls. As shown input line Ls is connected with the input winding $e$ of the first-stage core of the sign storage register Ms, so that depression of key Ws enters a digit 1 denoting the minus sign into this register. Input lines L1, L3 and L5 are connected by way of diodes $d$ to the input of register M1 so that depression of any one of keys W1, W3, W5 enters a 1 into this register. Input lines L2 and L3 are connected through diodes to the input of register M2; and input lines L4 and L5 are connected through diodes to the input of register M3.

By comparison with Table I above it will be seen at once that depression of any one of keys W0 to W5 acts to enter a 1 into only the particular one or ones of the three registers M1, M2, M3 which are required in order that the combined of these three registers will represent, in the binary code as given in that table, the absolute value from 0 through 5 corresponding to the depressed key. Thus by depressing a selected one of absolute-value keys W0 . . . W5 and depressing or not depressing sign key Ws, any algebraic-quinary digit complete with sign can be stored in the storage or memory device comprising the four recirculatory binary registers M.

Immediately after delivery of a pulse from the outputs of multivibrators $Si$ and $Si'$ to the L input lines, said multivibrators (or other pulse sources not shown) are adapted to transmit a uniform train of shift pulses which are applied to all the shift windings $sh$ of the four registers. Thus any binary 1 digit entered into a register will be stepped through the stages and recirculated in the well-known manner to reappear at predetermined cycle times of a recirculatory cycle in any given stage of each register. Synchronizing means, also conventional serve to synchronize recirculation through the respective registers including both the sign and absolute-value registers. Such recirculatory and synchronizing means being entirely conventional need not be described in detail.

It will be understood that the input device thus described does not effect conversion from decimal to algebraic quinary, but requires that such conversion be first performed by some other means. Thus, if desired with the input device of FIG. 1 to enter the decimal number 19573 into the memory device, this number must first be converted into its algebraic-quinary representation which is 20433, after which the respective digits of this number may be entered into storage by manipulation of the key W0 to W5 and Ws in the manner described above. According to a preferred embodiment of the invention, however, the entire date-input process including both decimal-to-algebraic-quinary conversion and entry of the algebraic-quinary number into storage, is performed automatically in a manner now to be described.

It is convenient first to summarize the laws of conversion and binary coding of the converted number as used in this invention, by means of the following Table II:

*Table II*

| Decimal Representation | Carry | Sign | Absolute value | | | Cauchy Representation |
|---|---|---|---|---|---|---|
| | | | $2^2$ | $2^1$ | $2^0$ | |
| 0 | 0 | + | 0 | 0 | 0 | 0 |
| 1 | 0 | + | 0 | 0 | 1 | 1 |
| 2 | 0 | + | 0 | 1 | 0 | 2 |
| 3 | 0 | + | 0 | 1 | 1 | 3 |
| 4 | 0 | + | 1 | 0 | 0 | 4 |
| 5 | 1 | − | 1 | 0 | 1 | 1$\overline{5}$ |
| 6 | 1 | − | 1 | 0 | 0 | 1$\overline{4}$ |
| 7 | 1 | − | 0 | 1 | 1 | 1$\overline{3}$ |
| 8 | 1 | − | 0 | 1 | 0 | 1$\overline{2}$ |
| 9 | 1 | − | 0 | 0 | 1 | 1$\overline{1}$ |
| 0 | | − | 0 | 0 | | $\overline{0}$ |
| 5 | | + | 1 | 0 | | 5 |

The last two lines of the table indicate forms of the decimal values 0 and 5 which do not properly belong to the input code now being described, but which may occur during computation in the arithmetic operators of the machine and hence have been included for completeness.

As will be apparent from comparison of the second and third columns of this table, whenever a carry is present, the sign of the corresponding Cauchy digit is minus, which is represented by digit 1. This permits a desirable simplification of the circuits since both the sign digit and the carry digit can be represented by the same information bit, as already explained.

Figure 2:
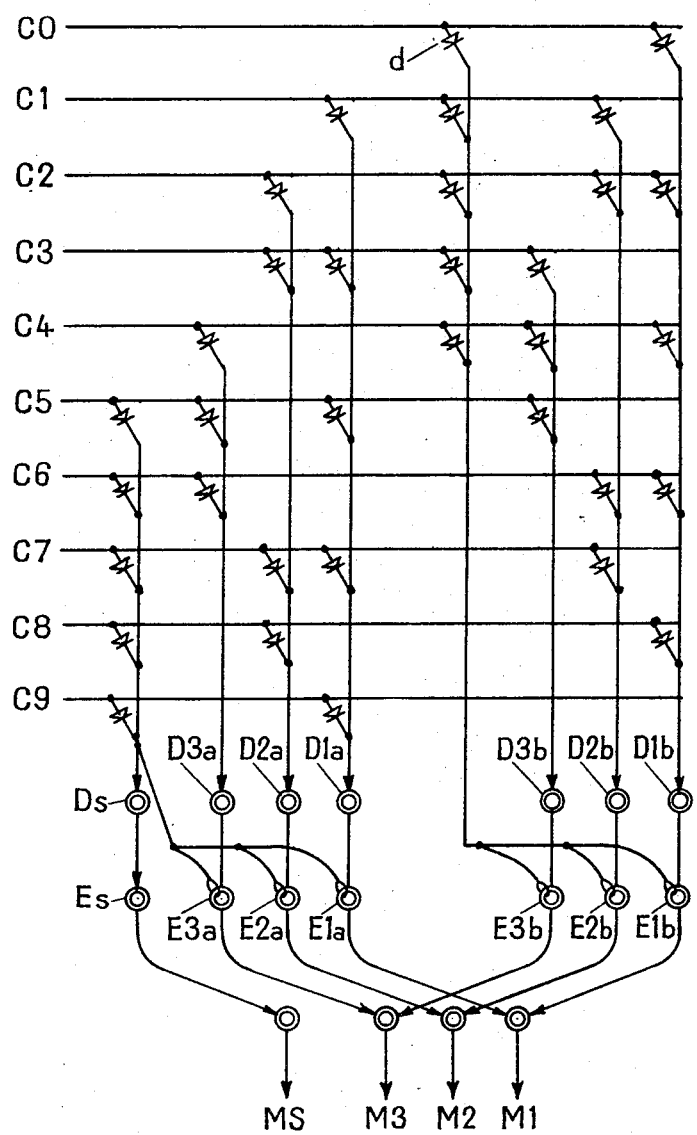
FIG. 2 shows one form of decimal-to-algebraic quinary conversion matrix usable as a serial input system for a computer according to the invention, wherein the serial entry of a multidigit number is effected in descending order.

In FIG. 2 are shown ten decimal input lines from C0 to C9 to which input voltage pulses may be selectively applied by any suitable means not shown. Such means may comprise the keys of a keyboard or switches adapted for automatic operation from perforated tape, magnetic tape and the like. At the bottom of the figure are shown four cores MS, M1, M2 and M3 which constitute the first-stage cores of recirculatory registers similar to those shown in FIG. 1 and comprising a recirculatory storage or memory. The problem, then, to be solved by the input circuit shown is that energization of any one of the decimal input lines C0 through C9 shall result in the application of a pulse to the requisite one or ones of the four cores M in accordance with the conversion rules of Table II, these rules including the requirement that on sequential energization of various of the decimal input lines C0 to C9 for the serial entry of a multidigit decimal number into the memory, a carry digit 1 will have to be transferred from one energization time to the next following energization time, whenever a carry is specified in the second column of Table II.

As shown, the input lines C0 to C9 are connected by way of diodes $d$ in a matrix circuit with a set of seven cores, designated D$s$, D3$a$, D2$a$, D1$a$; and D3$b$, D2$b$, D1$b$. It is noted at this point that for simplicity the cores are here shown schematically without the associated windings, but merely with input and output lines leading to and from them.

Considering first the cores D$s$, D3$a$, D2$a$ and D1$a$, the diode connections between the decimal input lines and these cores are such that the energization of any one of the input lines will apply a pulse to the particular one or ones of these four cores, as is required by Table II to cause the Cauchy representation of the decimal number associated with the energized input line to be stored in these four cores. Thus, energization of input line C1 is seen to apply a pulse to core D1$a$ only; input line C2 applies a pulse to core D2$a$ only; input line C3 applies pulses to both cores D1$a$ and D2$a$; line C4 pulses core D3$a$ only; line C5 pulses core D$s$ (because of the minus sign) and cores D1$a$ and D3$a$; and so forth.

Referring next to cores D3$b$, D2$b$ and D1$b$, these are so connected by way of diodes with the decimal input lines that energization of an input line applies pulses to the particular one or ones of these three cores as is required by Table II to cause these three cores to store the binary code representation of a digit absolute value of higher by one unit than the value of the energized input lines. That is to say, the diode connections are such that energization of input line C0 applies a pulse to core D1$b$ (representing absolute value of digit 1); input line C1 pulses core D2$b$ (absolute value of 2); input line C2 pulses cores D1$b$ and D2$b$ (absolute value of 3); and so forth; then similarly input line C5 pulses core C3$b$ (absolute value of 6); line C6 pulses both cores D1$b$ and D2$b$ (absolute value of 7) and so on.

Connected respectively with the outputs of cores D$s$, D3$a$, D2$a$ and D1$a$ are the inputs of cores E$s$, E3$a$, E2$a$ and E1$a$; and connected with the outputs of cores D3$b$, D2$b$, D1$b$ are the inputs of cores E3$b$, E2$b$ and E1$b$. Each of the three cores E3$a$, E2$a$ and E1$a$ in addition to having its input, output and shift windings, is provided with an inhibitor winding, shown as a loop, and all these inhibitor windings are arranged to be energized in parallel, through diodes, from each of the five decimal input lines C5 to C9 corresponding to those decimal digits which involve a minus sign, and hence a carry, in their Cauchy representation. Similarly each of the three cores E3$b$, E2$b$, E1$b$ has an inhibitor winding which windings are all energized, through diodes, from the remaining decimal input lines C0 through C4.

Core E$s$ has its output connected to the input of the sign register MS; cores E3$a$ and E3$b$ have their outputs connected simultaneously (or in actual practice by way of a logical or-circuit not shown) with the input to register M3; cores E2$a$ and E2$b$ similarly have their outputs connected to the input of register M2; and cores E1$a$ and E1$b$ have their outputs connected to the input of register M1.

The operation of the circuit described will be best understood by using an example. Assume it is desired to enter the five-digit decimal number 19,573. Input line C1, corresponding to the highest-order digit of the number is first energized. This sets core D1$a$ to its 1-state; it also sets core D2$b$ to its 1-state; and it inhibits all three cores E3$b$, E2$b$ and E1$b$. Next input line C9 corresponding to the next-higher order digit of the desired decimal number is energized. This, through conventional shift means not shown, first transfers the states of the D-cores into the corresponding E cores. Thus in the left-hand set the 1-state contained in core D1$a$ as just described is transferred to the core E1$a$ while the zero-states present in cores D$s$, D3$a$ and D2$a$ can similarly be regarded as being transferred to cores E$s$, E3$a$ and E2$a$. However, among the right-hand cores, the 1-state contained in core D2$b$ cannot be transferred into the corresponding E2$b$ core, because of the inhibition of this core which resulted from the energization of input line C1 just before. Hence all three cores E3$b$, E2$b$ and E1$b$ retain zero-states. Upon all the D cores having been cleared, the energization of input line C9 now sets the cores D$s$ and D1$a$ to their 1-states as required to enter the decimal value 9 into these cores.

We now energize input line C5 corresponding to the third digit of the selected decimal number. This first shifts the present states of the uninhibited cores E into the highest-stage cores of the respective memory registers M, clearing cores E; shifts the present states of cores D into the respective cores E, unless inhibited; clearing cores D; and finally enters the representation of decimal 5 into the cores D. Thereafter, energization of input line C7 (fourth digit of the decimal number being entered) will have similar actions, but in addition the present states of the highest-stage cores of storage registers M will be stepped to the next-highest cores of said registers, not shown in FIG. 2 but similar to the showing in FIG. 1; thus the highest-stage cores are cleared to receive the new contents of cores E. The entire five-digit decimal number can thus be entered into the four-register storage device M in the form of four binary information digits that will then be recirculated in parallel in the four storage registers.

It will be noted that the cores E1$a$ through E3$a$, and the cores E1$b$ through E3$b$, can be regarded as constituting two temporary storage means which serve to memorize the absolute value of each digit being entered until entry of the next digit, at which time the contents of either one or the other of the temporary storages is transferred to the final storage M depending on the sign of the first-mentioned digit.

Figure 3:
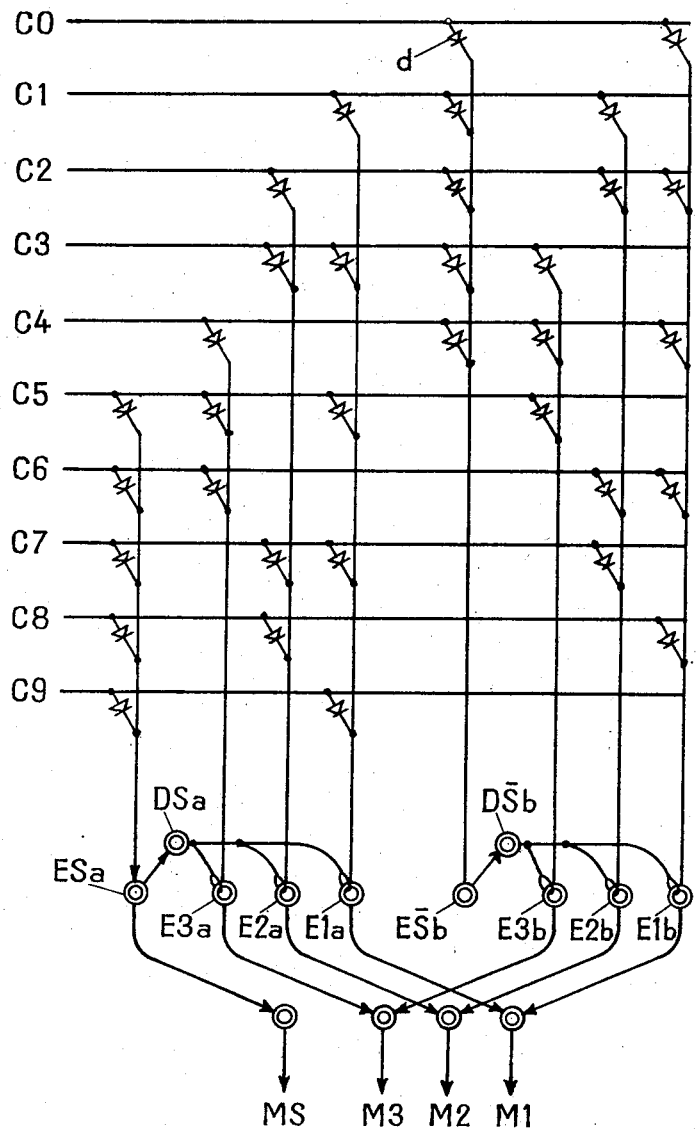
FIG. 3 shows an alternative form of conversion matrix for serial entry in ascending digital order.

FIG. 3 illustrates a modified input converting circuit whereby a multidigit decimal number can be serially entered into a computer storage according to the invention starting with the lowest-order digit, i.e., in ascending digital order rather than in the descending digital order required to be used with the input circuit of FIG. 2. The circuit is much the same as that of this last figure and corresponding elements have been similarly designated. The difference is that the seven "stage-D" two-state elements of FIG. 2 are here omitted and instead a single pair of two-state elements, e.g., ferrite cores, designated D$sa$ and D$\overline{s}b$, are provided. Core D$sa$ has its input supplied with the output from element E$sa$ and has its output feeding the inhibitor windings associated with each of cores E3$a$, E2$a$ and E1$a$. Furthermore, a core E$\overline{s}b$ is provided, having its input supplied with the diode outputs from input lines C0 to C4. Core D$\overline{s}b$ is associated with the cores E$\overline{s}b$, E3$b$, E2$b$ and E1$b$ in the same relationship as core D$sa$ is associated with cores E$sa$, E3$a$, E2$a$ and E1$a$. The operation of this circuit is generally similar to that of the circuit of FIG. 2. However, it will be noted that immediately after the entry of data into the stage-E cores, those information bits that are not inhibited by the presence of a bit in either D$sa$ or D$\overline{s}b$ are transferred to the M storage registers, while the bit present in either E$sa$ or E$\overline{s}b$ is stored in D$sa$ or D$\overline{s}b$ respectively in order to inhibit a bit to be entered on introduction of the next digit. Furthermore, the entry of a decimal digit on any one of the input lines C0 to C9 acts to inhibit the transfer into the M storage registers of the data stored in either the set of cores E$sa$, E3$a$, E2$a$, E1$a$, or in the set of cores E$\overline{s}b$, E3$b$, E2$b$, E1$b$, according as a 1-bit is stored in D$sa$ or in D$\overline{s}b$. In this circuit, it is necessary that prior to the entry of the first digit of a decimal number, a 1-bit is stored in core D$\overline{s}b$ in order to clear any information that may be present in E1$b$, E2$b$ or E3$b$.

By selecting any exemplary multidigit decimal number and using a discussion similar in its general lines to that given above in connection with FIG. 2, it will be readily verified that the circuit of FIG. 3 permits serial entry of such number into the M storage registers starting with the lowest-order digit of the number and proceeding in ascending sequence.

FIG. 4 illustrates a general block diagram of an algebraic adder operator usable according to the invention for performing algebraic addition. The components of this system will be described in detail later. The system as shown comprises a pair of so-called sign-selector units CA and CB which are fed respectively with the serial digits of the two operand numbers, A and B, to be algebraically added. The operand digits may be applied from respective storages in which the operand numbers A and B are stored, each storage including four recirculatory registers such as the registers MS, M1, M2, M3 previously described. As the respective operand digits are applied in synchronism to the inputs of sign selectors CA and CB, it being understood that digits of equal order in both operand numbers are applied to the two sign selectors in synchronism, the sign selectors act to direct each positive Cauchy digit into an absolute-value adder ADP and each negative Cauchy digit into an absolute-value adder ADN. These absolute-value adders are so designed, as will presently appear, that if the A and B digits fed simultaneously to either adder at any given time are of opposite sign, they are allowed to pass unaltered; if however they are of similar sign, the adder puts out a value corresponding to the sum of their absolute values. The outputs (designated UP and UN) from both absolute-value adders are applied to a two-input "transcriber" unit T which modifies the successive digits of the two said outputs in a manner to be later explained, so as to deliver a serial output F representing the sequential digits of the desired algebraic sum, as expressed in the binary-coded algebraic quinary form.

The components of FIG. 4 will now be described in detail, with reference to exemplary embodiments.

Figure 5:
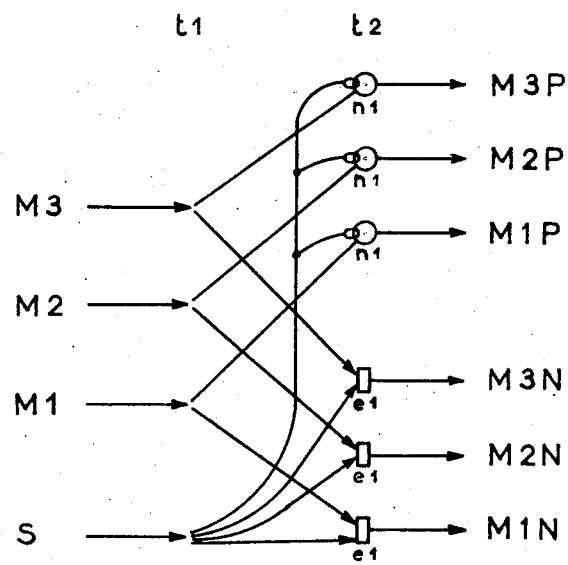
FIG. 5 shows detailed logical circuitry of one of the two similar sign selector units used in the adder of FIG. 4.

FIG. 5 illustrates one desirable embodiment of a sign-selector circuit usable as either of the units CA or CB of FIG. 4, which are similar. The four parallel inputs over which the binary data representing the absolute value and sign of an operand number are applied, are shown at M3, M2, M1, and at S, respectively. Each of the absolute value input lines M3, M2, M1 is applied simultaneously to a related one of three "inhibitable" circuits $n1$, each comprising a core having an inhibitor winding thereon, similar to what was shown, e.g., at E3a in FIGS. 2 and 3, and to a related one of three logical "and"-circuits $e1$. The sign input line S is applied simultaneously to the inhibitor input of each of the three circuits $n1$, and to a second input of each of the three and-circuits $e1$. The outputs from the three inhibitors, or "not-circuits" $n1$, designated M3P, M2P and M1P, are connected to the input of the positive absolute-value adder ADP of FIG. 4, while the outputs of the and-circuits $e1$, designated M3N, M2N, M1N, are connected to the input of the negative absolute-value adder ADN.

Assuming the operand-digit (from operand number A or B of FIG. 4) applied to the input of sign-selector circuit of FIG. 5 is positive, a 1-bit is present on at least one of the input lines M3, M2, M1, while no 1-bit is present on line S. In such case the particular not-circuits $n1$ connected with the input lines which have a 1 therein, pass the 1-digit to the input of absolute-value adder ADP. At this time moreover, none of the and-circuts $e1$ puts out an output since each of them has one of its inputs deenergized. If however, the input digit is negative, the S input line is energized. This inhibits all three not-circuits $n1$, so that no output is supplied to adder ADP. On the other hand, the particular circuits $e1$ connected with the M input lines that are energized deliver an output since their other input is also energized from the sign input line S. Thus the 1-digit or digits representing the absolute-value of the input digit is or are passed to the negative absolute-value adder ADN. At this time moreover, all three not-circuits $n1$ are inhibited due to energization of the sign input line S, so that no output is passed to the positive absolute-value adder ADP.

Figure 6:
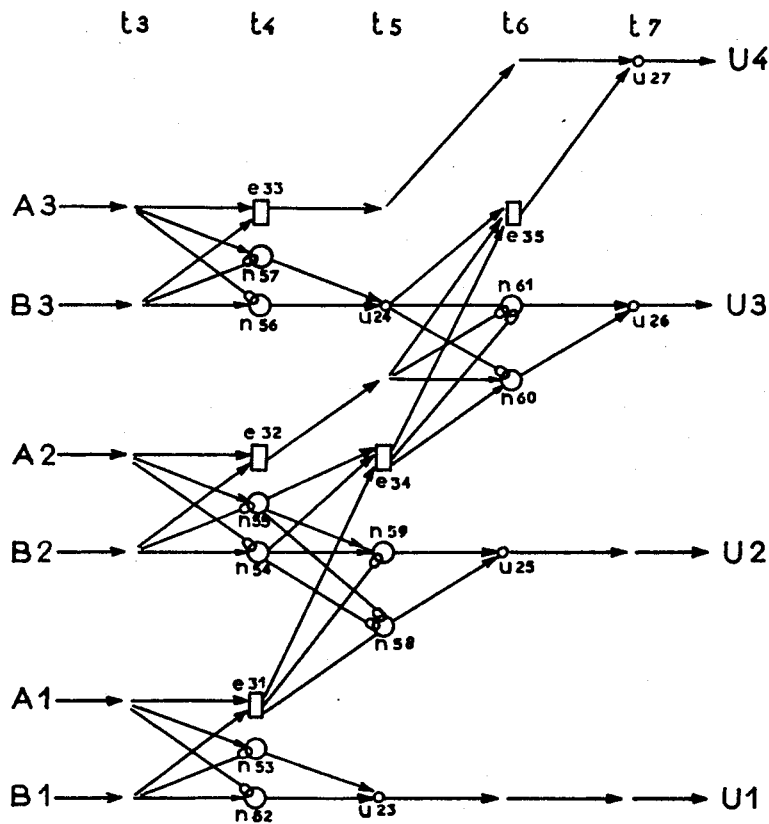
FIG. 6 shows a preferred form for each of the two similar absolute value adder units used in the adder of FIG. 4.

FIG. 6 illustrates a preferred embodiment of absolute value adder circuitry usable as either unit ADP or ADN of FIG. 4 both of which units are identical. The circuit has a first set of three input lines A1, A2, A3 extending from the sign selector CA of FIG. 4 and a second set of input lines B1, B2, B3 from sign selector CB, and it will be understood from previous explanations that at any time period of operation there is at least one of the three input lines that is energized to represent the absolute-value of a digit of the operand number A, and at least one of the B input lines energized to represent the absolute value of the corresponding-order digit of operand number B. For readier intelligence, the circuit components will be explained in terms of the serial operation of the circuit as a whole. Referring back to FIGS. 4 and 5, assume that an A digit and a B digit of corresponding digital order are applied to the respective sign selectors CA and CB at a certain operating time $t1$ of the operating cycle (as indicated at the top of FIG. 5). The operation of the sign-selection circuitry of FIG. 5 requires two time periods owing to the inherent operation of the and- and not-circuits used therein. Thus at time $t3$ there may be 1-bit present on at least one of the input lines A3, A2, A1 of FIG. 6, and there may be a 1-bit present on at least one of the input lines B3, B2, B1. Consider in FIG. 6 each pair of the input lines such as A1–B1, A2–B2, and A3–B3 which relate to corresponding powers of 2 in the binary code representation of the absolute values of the two operand digits. It will be noted that both lines of the pair are connected with respective inputs of a related and-circuit $e31$, $e32$ or $e33$; that the A-line of the pair is connected with the input of a not circuit $n53$, $n55$, $n57$ which has its inhibitor input connected with the B-line of the pair; and that the B-line of the pair is connected with the input of a not-circuit $n52$, $n54$, $n56$ which has its inhibitor input connected with the A-line of the pair. Hence, at operating time $t4$ following the time $t3$ at which input digital values are applied over the lines A and B, no output can be transmitted from either of the two not-circuits such as $n52$ and $n53$ of any pair, if both the A and B line of the pair considered are simultaneously carrying 1-values, since each line will then inhibit the not-circuit supplied from the other line of the pair; however, if only one of the lines of an A–B pair is carrying a 1-value, such 1-value will be transmitted through either one or the other of the two not-circuits such as $n52$ and $n53$, associated with the pair of input lines considered. In contrast, where both lines of an input pair are carrying 1-values, the and-circuit, such as $e31$, associated with said pair will transmit an output 1-value at time $t4$; while where only one line of a pair is carrying a 1-value, the related and-circuit will not transmit a 1-value.

At time $t5$, the outputs from all the not- and and-circuits so far described are utilized as follows. In the input pair A1–B1 relating to the 2° positions of the binary code numbers representing the absolute values of the operand digits, both not-circuits $n52$ and $n53$ have their outputs applied to an or-circuit $u23$, the output of which is connected with the output line U1 of the absolute-value adder circuit. Line U1 is one of four output lines U1 through U4. Of these, lines U1, U2 and U3 are to convey the binary code representations of the absolute value sum of the respective pairs of operand digits; while line U4 may convey a 1-digit carried over from the line U3, as will presently appear. Thus it is seen that line U1 has a 1-value applied to it if one and only one of the two input lines A1 and B1 has a 1-value thereon. If both A1 and B1 have a 1-value, then U1 has no 1-value applied to it;

but the and-circuit e31 then emits a 1-value to serve as a carry.

This carry 1-value from and-circuit e31 is applied to the inhibitor input of a not-circuit n59 whose input is supplied (by way of an or-circuit not shown) with the outputs of both n54 and n55 associated with input lines A2–B2. Thus the carry unit from U1 clears the output line U2 of any 1-value that may have been applied to it. Further, the carry unit from e31 is transmitted to the output line U2 by way of a not-circuit n58 shown as having two inhibitor inputs respectively supplied with the outputs of both n54 and n55 associated with input lines A2–B2. Lastly the carry unit from e31 is applied as one of three inputs to a logical circuit e34 the other two inputs to which are derived from n54 and n55. Circuit e34 is a logical circuit so designed as to emit an output whenever two of its three inputs are energized.

Considering the input pair A2–B2, it is seen that similarly to pair A1–B1, a 1-value is transferred through n54 or n55 at time t4 in the event that one and only one of the input lines has a 1-value on it. A 1-value when thus transferred is passed at time t5 to output line U2 by way of not-circuit n59, only if the latter is not inhibited by the presence of a carry unit applied from e31 as just described. The output line U2 is seen to receive, by way of an or-circuit u25, a 1-value from A2 or B2 if one and only one of these lines has a 1-value applied to it and there is no carry from and-circuit e31, or further if neither of these two lines had a 1-value applied to it and there is a carry unit applied by way of and-circuit e31. When however there is 1-value applied from the input pair A2–B2 and a carry from e31, then the output line U2 does not receive a 1-value; in that case however, the logical circuit e34 has two of its three inputs energized and emits a carry towards the next higher binary stage.

The afore-mentioned and-circuit e32 emits a carry when both lines A2 and B2 are conveying 1-values. This carry will be utilized at the time period t6.

Considering now the input pair A3–B3, the not-circuits n56 and n57 transfer a 1-value input to an or-circuit u24 when one and only one of said input lines has a 1-value thereon. And-circuit e33 transmits a carry-unit (of binary value $2^3$) when both input lines A3 and B3 have 1-values applied to them.

At time t6, the carry unit of binary value $2^2$ as applied either from e34 or from e32 inhibits a not-circuit n61 to prevent transmission to output line U3 of any 1-value from u24, thus clearing line U3. Moreover said carry is transmitted to line U3 by way of not-circuit n60 which in turn can be inhibited by a 1-value from u24, and said carry is also transmitted to a logical circuit e35 of similar type to e34 described above, which can only transmit an output if simultaneously energized with an output from u24.

Thus output line U3 will receive a 1-value by way of or-circuit u26, if there was no carry from the preceding binary stage and if there is a 1-value on a single one of the lines A3–B3; or alternatively if there was a carry from the preceding binary stage and a 1-value on neither or on both of lines A3 and B3. But line U3 will transmit no output if there is simultaneously a 1-value on a single one of lines A3–B3 and a carry from the preceding binary stage. In this latter case, the circuit e35 is energized to transmit an output at time t6.

An or-circuit u27 connected to receive inputs from the output of e35 and from the output of e33 acts, at time t7, to transmit a 1-value of binary order $2^3$ over output line U4, if either of circuits e33 and e35 has transmitted a 1-value as previously described.

It will be understood that conventional means are provided in the circuit just described as in other parts of the apparatus for ensuring the proper synchronism between the signals transmitted. Thus any conventional delay-circuit adapted to impart one time-period delay to the signals are interposed at the proper points in the circuit of FIG. 6, and the positions of such delay circuits have been shown as single arrow-heads in the diagram.

FIG. 7 illustrates a first part of the transcriber unit T, while FIG. 8 shows the second part of this unit. The outputs U1, U2, U3, U4 from adder ADP are applied to the respective inputs U1P, U2P, U3P, U4P of transcriber T; while the outputs U1, U2, U3, U4 from adder ADN are applied to transcriber inputs U1N, U2N, U3N, U4N. The input of information is assumed to occur at time t10. The values on lines U2N and U3P are compared in and-circuit e8 at time t11. If this and-circuit is energized its output acts at the next operating time t12 to inhibit the information that acted to energize it. That is, it inhibits U2N by way of not-circuit n7 and U3P by way of not-circuit n10. Further, and-circuit e8 transmits an output to line U2P. At the same time and symmetrically, lines U3N and U2P are compared in and-circuit e9 and, if this is energized, the information on said lines is inhibited in line U3N by means of n8 and in line U2P by means of n9; also, an output is transmitted to line U2N. The effect of the circuitry just described is to effect the subtraction $\pm(2^2-2)$ when these respective values are present on lines U2N and U3P, and to deliver the corresponding effected output $\pm 2$.

The three inputs of lower binary order are compared at time t12 by an and-circuit as between the positive and negative input lines of equal binary order, that is: U1N and U1P are compared through e10; U2N and U2P through e11 and U3N and U3P through e12. At time t13, should one of the and-circuits be active, its output inhibits the information that rendered it active; thus e10 inhibits U1N and U1P through n11 and n14; and inhibits U2N and U2P through n12 and n15; and e12 inhibits U3N and U3P through n13 and n16. Consequently, after time t13 there can be no 1-value of equal binary orders in any pair of opposite-sign lines, and the algebraic sum of the input values at time t13 remains the same as it was at the initial input time t10, so that the initial conversion of the sum $2^2-2$ is unable to disturb the said algebraic sum at time t13.

The input lines U3 and U2 of common algebraic sign are compared with each other in and-circuit e13 as regards the negative inputs, and e14 as regards the positive. Should either of these and-circuits have both of its inputs energized, the sum of the absolute values of these inputs is $2^2+2=6$. The output from e13 or e14 inhibits through n19 and n20 (for negative values) and n21 and n22 (for positive values), the information which activated the and-circuit. Moreover, an output (of decimal value 10) is transmitted to a carry-line of the same sign through an or-circuit u8 or u9 which has its other input supplied with the 1-value that may be present on line U4 (which cannot contain a 1-value at the same time as line U3 does) and an output is again transmitted over line U3, its value being $-(2^2)$. The absolute value, which was $2^2+2=6$ at time t13, remains unchanged at time t15 even though it is now present in the form $10-2^2=6$.

The operation of the circuit shown in FIG. 7 then proceeds in a manner that will be readily ascertainable from an analysis of the remaining circuit elements and connections therefrom through times t15 to t18, and it will be seen that at time t18 the first portion of the transcriber shown in FIG. 7 allows the application of absolute values not greater than 5 to the set of positive intermediate output lines V1P, V2P, V3P, and negative intermediate output lines V1N, V2N, V3N.

In the second portion of the transcriber circuit shown in FIG. 8, the logical circuitry progressively reduces by a similar amount the absolute values of the numbers carried by each set of negative and positive lines, so as finally to apply to the output lines FS, F3, F2, F1, binary values that represent the desired algebraic quinary number with its proper sign. The manner in which the circuitry of FIG. 8 accomplishes this result will be apparent from a study of that figure in the light of the ensuing detailed description of the operation of its initial stage through times $t20-t22$.

At time $t20$ both and-circuits $e23$ for lines V1N and V1P and $e24$ for lines V2N and V2P compare the values of similar binary order occurring at time $t19$. When either of the end-circuits has been activated, it inhibits at time $t21$, the data received by it, of absolute value $2^0$ and $2^1$ respectively, such inhibition being effected by way of $n33$ and $n35$, or $n34$ and $n36$. This results in cancelling all values of equal binary order and of opposite sign from lines V1N and V1P on the one side, and V2N and V2P on the other. A similar and-circuit need not be provided upon the other two lines V3N and V3P, since the output from the circuit of FIG. 7 cannot provide in any event simultaneous 1-values upon both lines V3N and V3P of respective values $-2^2$ and $+2^2$.

Thus the circuit of FIG. 8 in its successive stages progressively acts on the data received by it. At time $t22$, the algebraic sum $2^2-2$ present at time $t21$ is replaced by the equal value 2, contained in the upper (positive) or lower (negative) section depending on which contained the larger absolute value. Similarly, at time $t24$ the algebraic sum $2^1-2^0$ is replaced by the equal value $2^0$ contained in the (positive or negative) section in which the larger absolute was present. In a third stage at time $t26$, the algebraic sum $2^2-2^0$ is replaced by the equal value $2^1+2^0$ contained in the section in which the larger absolute value was present.

In the circuit of FIG. 8, only one out of the various and-circuits shown was able to operate for transferring a single 1-digit, owing to the action of the first part of the transcriber circuitry (FIG. 7). Consequently at the time $t27$ the algebraic sum of the entered digits is contained entirely in the positive section, or in the negative section, of the circuit. At time $t27$ therefore, should a 1-value be contained in one or more of the negative lines, such 1-value will at the next time $t28$ be applied to an or-circuit $u18$ which transmits a 1-value to the sign output line FS which thus puts out a "minus" sign signal. The lines of common digital order transmit any 1-values they may contain over the corresponding output lines F by way of or-circuits at time $t29$. Thus V1N and V1P feed F1 through $u19$; V2N and V2P feed F2 through $u20$; V3N and V3P feed F3 through $u21$. The desired number as obtained on lines F is thus expressed in the binary-coded algebraic quinary notation desired.

It will be noted that the transcriber circuitry described may serve per se to convert into binary-coded algebraic quinary notation any multidigit decimal number having its digits coded in the binary notation. For this purpose the binary digits need simply be applied to lines U1P, U2P, U3P, U4P at the input of the transscriber, or at time $t13$ without applying data to the negative input lines U1N, U2N, U3N, U4N.

FIG. 9 illustrates a circuit which is interposed ahead of the algebraic addition operator previously described (FIG. 4) for the purpose of selecting addition or subtraction. A "Subtract" signal SST is applied to a not-circuit $n49$ connected in a recirculation loop with a delay network $r3$ so as to provide a data recirculation frequency around the loop equal to the information input frequency. The subtract signal thus stored can be erased on completion of a subtraction process by applying an ADD signal to the inhibitor input of $n49$. The output of the recirculation loop is connected by way of not-circuit $n51$ and or-circuit $u22$ to the sign input line S of the adder operator (FIG. 4) and is also connected to the inhibitor input of a not-circuit $n50$ connected to the other input of or-circuit $u22$. A "minus" line MS is connected with the inhibitor input of $n51$ and with the input of $n50$. When a subtract signal is recirculating through the loop, then if line MS also contains a 1-value, constituting a "minus" signal, $n51$ is inhibited together with $n50$ and no output is passed through $u22$, and the adder operator will therefore perform arithmetical addition. The same is true if neither SST nor MS has a 1-value. However, should a 1-value be present on either of lines SST or MS, such 1-value is passed to output line S and subtraction is then performed.

With reference to FIGS. 10 and 11, multiplier circuitry according to the invention will now be described. In multiplying a pair of operand digits expressed in the algebraic quinary system used in the invention it is necessary to multiply the absolute values of the two digits and also to "multiply" the signs of the two digits, i.e., provide a product sign derived from the signs of the operand digits in accordance with the rules of algebraic multiplication.

FIG. 10 illustrates a sign multiplying circuit. Its two inputs AS and BS are the sign storage registers of the two storages in which the respective operands are being recirculated. A signal present on each of these input lines is applied to a not-circuit $n62$, $n63$ connected for inhibition by a signal present on the other input line. The outputs of the $n62$ and $n63$ are applied to an or-circuit $u28$ the output of which delivers the product sign signal S. It is readily seen that a signal (minus sign) will be present on output S if one and only one signal (minus sign) is present on an input AS or BS.

FIG. 11 illustrates a matrix type circuit for multiplication of the absolute values of both operand digits A and B. This circuit is based upon a transposal into the binary system of an abacus which appears to have been first described in a sixth century Sanskrit text attributed to Brahmagupta (cf. Th. Colebrooke, Algebra with Arithmetic and Mensuration From the Sanskrit of Brahmagupta and Blaskara Acharya, London, 1817) and later introduced into Western Europe by the Arabs in the fifteenth century.

In this circuit the input lines A1, A2, A3 convey the binary digits of the absolute value of A, respectively in the digital orders $2^0$, $2^1$, $2^2$; and input lines B1, B2, B3 convey the binary digits of the absolute value of B in the same respective orders. The two sets of three input lines are crossed to form a matrix pattern with nine junctions or vortices. At each vortex is an and-circuit numbered from $e36$ through $e44$ having its two inputs connected to the respective input lines occurring at the vortex. Whenever one of these and-circuits emits an output at time $t2$ (the operating time $t2$ is selected so as to allow the product sign to be formed by the circuit of FIG. 10 before the product absolute value), such output represents the binary product of the input binary digits into the and-circuit. Thus the output from $e36$ is $2^0$ since $2^0 \times 2^0 = 2^0$ and this value is passed to output line K1. The outputs from $e37$ and $e39$ are $2^1$ since $2^0 \times 2^1 = 2^1$, and the outputs from both these and-circuits are passed to or-circuit $u29$ and thence at time $t3$ to output line K2. Similarly the three and-circuits $e38$, $e40$ and $e42$ each deliver an output representing $2^2$ and these outputs are passed through $u30$ to output line K3. The two and-circuits $e41$ and $e43$ yield outputs each representing $2^3$ which are passed through $u31$ to output line K4. Lastly $e44$ yields an output representing $2^4$ directly passed to output line K5.

Thus it is seen that the mutual products of the binary digits carried by a pair of respective input lines from the two input sets A and B yield a single output digit by way of the and-circuit at the vortices of the matrix in all those cases where each of the quinary operand digits is expressed by a single binary digit, i.e., 1, 2 and 4. But quinary digits 3 and 5 are each expressed by two binary digits, so that the product of either of these quinary digits 3 or 5 times 1, 2 or 4 will yield two binary digits of different digital order. Similarly the product 3 times 5 will yield four binary digits all of different digital order, and in these cases the circuit as so far described will operate correctly to provide output binary digits by way of or-circuits $u29$ through $u32$. However, in the case of 3 squared and 5 squared, there will be four output binary digits only two of which are of equal digital order. When a digit 3 is present both in operand A and operand B, lines A1, A2, B1 and B2 are all energized. And-circuits $e36$, $e37$, $e39$ and $e40$ all deliver outputs. The output from $e36$ is passed to output line K1. The outputs from $e37$ and $e39$ which represent equal binary orders are applied to or-circuit $u29$ and and-circuit $e45$. The output from $e45$ inhibits, at time $t4$, a not-circuit $n64$ which is supplied with the output from $u29$, and a not-circuit $n65$ supplied with the output from $e40$ by way of $u30$; and-circuit $e45$ further passes its output by way of $u32$ to output line K4. Thus the signals on output lines K2 and K3 are inhibited, while the resulting carry is applied to output K4. This effects the sum $2^0+2\times 2^1+2^2=2^0+2^3$.

With a digit 5 in each of operands A and B, input lines A1, A3, B1 and B3 are all energized and and-circuits $e36$, $e38$, $e42$ and $e44$ deliver outputs. The outputs from $e36$ and $e44$ are applied to lines K1 and K5 respectively, representing digital values $2^0$ and $2^4$. The outputs from the remaining and-circuits $e38$ and $e42$ both represent the common binary value $2^2$ and are applied to or-circuit $u30$ and $e46$. The output from $e46$ inhibits, at time $t4$, the output from $u30$ and transmits a carry unit to output line K4. This effects the sum $2^0+2\times 2^2+2^4=2^0+2^3+2^4$.

FIG. 12 illustrates logical circuitry for converting an algebraic quinary digit expressed in binary code into the form of a single digit from 0 through 5 and a sign as an intermediate step prior to the final output conversion later described. The digits are applied to the circuit of FIG. 12 in ascending digital order so as to supply a minus sign to any 0 digit immediately following a digit having the minus sign and thus provide an output in the form of a 9.

At the time $t1$, a three-input or-circuit $u33$ having its inputs connected with lines F1, F2, and F3, provides an output if the absolute value of the digit applied is other than zero. This output from the or-circuit, if present, inhibits at time $t2$ a not-circuit $n70$ for a reason to appear later, and also inhibits a not-circuit $n66$ supplied with clock pulses H. The clock pulses are therefore suppressed until such time as there may be one or more binary values on F1–F2–F3. Otherwise the clock pulses are passed by $n66$ to the output line J0, to provide a zero value at the output.

Not-circuit $n67$ at time $t2$ receives a 1-value, if any, from line F1. This circuit can be inhibited by either of the 1-values that may occur on line F2 or F3. Thus the output line J1 can only have a 1-value on it if the absolute value of the input digit is 1.

Not-circuit $n68$ at time $t2$ receives a 1-value if any occurring on line F2, but is inhibited by any 1-value on line F1. Thus it only delivers a 1-value output on line J2 if the absolute value of the input digit is 2.

And-circuit $e47$ at time $t2$ receives both values present on inputs F1 and F2. Therefore if both of these carry 1-values ($2^0$ and $2^1$) a 1-value is passed to output line J3, providing the absolute value $2^0+2^1=3$.

Not-circuit $n69$ at time $t2$ receives a value from input F3, but is inhibited by a 1-value from input F1 if any. It thus delivers a 1-value to line J4 only if the absolute value of the input digit is 4.

And-circuit $e48$ at time $t2$ receives both values from inputs F1 and F3 ($2^0$ and $2^2$). It delivers an output to J5 only if the absolute value of the input digit is $2^0+2^2=5$.

The sign bit is applied by way of input FS. If the sign is minus, an output 1-value is delivered to output JS by way of or-circuit $u34$ at time $t3$. At time $t4$ this 1-value if any, is also directed through delay circuit $r4$ to not-circuit $n70$ and therefrom is recycled to line JS by way of or-circuit $u34$ simultaneously with the next digit unless inhibited by a 1-value from $u33$. As previously mentioned this or-circuit $u33$ is activated every time the absolute value of the input digit is different from zero. Consequently circuit $n70$ acts to delete the input information unless a zero occurs after a digit having the minus sign, and similarly for all ensuing zeros until such time as a digit differing from zero occurs.

Thus for example, an input number $200\overline{0}341$ applied over the input lines F is converted to $2\overline{0}00\overline{3}41$.

FIG. 13 illustrates logical circuitry for deriving the final decimal output digit by energization of a corresponding one of ten output lines I0, I1, . . . I9, from each of the algebraic-quinary digits delivered by the circuit of FIG. 12 just described. At time $t0$ the absolute values are entered over two branched input lines extending from the J lines of FIG. 13, except for digit 5 which has a single input line associated with it. The 1-values put in over the lines J0 through J4, will at time $t1$ either pass by way of not-circuits $n71$ through $n75$ if no 1-value is present on sign input line JS, or through the and-circuits $e49$ through $e53$ having second inputs supplied from JS, if a sign signal is present. In the latter case the 1-value on the sign input JS inhibits the not-circuits $n71$ through $n75$.

Each of the output lines from the above mentioned not- and and-circuits, as well as input line J5, is connected with a pair of not-circuits, with the exception however of each of the two end-lines J0. In each said pair of not-circuits, the upper circuit designated by an even number has its output connected with a related one of the output lines I, while the lower odd-number, not-circuit of the pair has its output connected to the next lower one of said output lines. All even not-circuits $n78$ through $n94$ are inhibited by the presence of a 1-value (minus) on the sign input relating to the preceding digit if the read-out is effected starting with the lower digital orders, or the following digit if the read-out starts with the higher orders. The sign-bits from the preceding or succeeding digit are indicated in FIG. 13 as the two chain line paths adjacent line JS, it being understood that only one of these signal paths would actually be used. Thus, if starting with the lower-order, the sign bit occurring at time $t0$ is delayed, if necessary, in delay circuit $r5$, and then recycled to operate the even not-circuits at the time of the next digit. If starting with the higher orders, the sign bit is picked off in advance at the next digit. The odd not-circuits $n77$ through $n93$ are inhibited by the clock signal which then serves as a complement signal $\overline{S}$ i.e., the 2's complement of the minus sign, that is, a plus sign. The clock pulse therefore is preliminarily inhibited at time $t1$ by the 1-value, if any, representing the minus sign of the preceding or succeeding digit as explained above.

Thus it is seen that the set of even and odd not-circuits described will cause any given input line J$n$ (where $n$ is any integer from 0 through 9) to transfer a 1-value to the corresponding output line I$n$ if the corresponding digit is positive, and the digit of immediately lower digital order also is positive. But if the latter is negative, the output will issue over line I($n-1$). Similarly, where a digit carried by an input line J$n$ is negative, a 1-value thereon will issue over output line I($10-n$) or I($10-n-1$) according as the digit of immediately lower order is positive or negative. As regards the 0-value denoted by a signal on input J0, this is always transferred as a corresponding 0 signal on output I0 if positive and on output I9 line, denoting a 9 value, if negative; this results from the attribution of a minus sign to any zero that is followed by a digit having a minus sign, as explained re FIG. 12.

It will be apparent to those familiar with the field of digital computers that the logical circuits illustrated and described may be embodied in many different ways while still following the teachings of the invention. The ferrite cores expressly mentioned may be replaced in whole or part by any other types of two-valued elements, including semiconductive elements, magnetic film spots, parametrons, and so on. Also the logical circuit connections may be varied widely while still fulfilling equivalent logical functions.

What I claim is:

1. In a digital computer, a pair of sign-selector arrangements each comprising four main inputs, means for applying to three of said main inputs two-valued signals representing the digits of a three-digit binary number comprising an absolute value and for applying to the fourth main input a two-valued signal representing a sign; a set of three inhibiting circuits having each a transfer input, an inhibiting input and a positive output and a set of three "and" circuits having each a first and a second transfer input and a negative output; binary logical circuitry comprising for every one of said three main inputs a pair of connections for linking each of said three main inputs to the said transfer input of a different one of said inhibiting circuits, respectively, and to the first input of a different one of said "and" circuits, respectively, and a set of connections for linking said fourth main input to all of said inhibiting inputs of said inhibiting circuits and also to all of said second transfer inputs of said "and" circuits, for transferring a digit-representing signal from any of said three main inputs to a corresponding positive output of said inhibiting circuits when the sign representing signal present on said fourth main input represents a positive sign and for transferring said digit-representing signal to a corresponding negative output of said set of "and" circuits when said sign-representing signal represents a negative sign; a positive adder circuit having two sets of three inputs respectively connected with the positive outputs of a first one of said sign-selector arrangements and with the positive outputs of the other of said arrangements; a negative adder circuit having two sets of three inputs respectively connected with the negative outputs of said second arrangement, each adder having related output lines; and each adder containing binary logical circuitry responsive to the two-valued signals applied to the related adder inputs for transferring to the related output lines two-valued signals representing the arithmetic sum of the binary numbers applied to said related adder inputs if said numbers are of similar sign, and for transferring to said related output lines the applied two-valued signals unaltered if said numbers are of opposite sign.

2. In a digital computer, a pair of storage means each comprising four parallel binary registers having respective outputs and means for presenting in synchronism at the outputs of the registers of each storage means successive sets of four two-valued signals representing in binary code the signs and algebraic values 0, 1, 2, 3, 4 and 5 of serial digits of related multidigit operand numbers; a pair of sign-selector circuits having inputs connected with the respective register outputs of said respective storage means and each having a set of positive and a set of negative outputs; means in each sign selector for passing a three-digit binary number representing the absolute value of a digit in the related storage to said positive or said negative set of outputs depending on the sign associated with said digit; a pair of adder circuits each having two sets of inputs, the two sets of inputs of one adder being connected with the sets of positive outputs from the respective sign selectors, and the two sets of inputs of the other adder being connected with the sets of negative outputs from the respective sign selectors; means in each adder for serially adding the absolute-value numbers of corresponding digits of similar sign as passed thereto from both said selectors; and a transcriber circuit having two sets of inputs respectively connected with the sets of outputs of the adders and having a set of four outputs, and including logical circuit means for serially passing to said outputs two-valued signals representing the sign and absolute value of the algebraic sum of said operand digits, including means for effecting carries from one digit to the next, whereby carry propagation over any but the lowermost digital orders is eliminated.

3. A digital computer comprising input means including means for representing each of the decimal digits 0 through 5 as a set of four two-valued signals designating the corresponding three-digit binary number 0 through 5, respectively, and a plus sign and for representing each of the decimal digits 6 through 9, respectively, as a set of four two-valued signals designating the three-digit binary number which is the ten's complement of such decimal digit and a minus sign, and means for adding unity to the three-digit binary number representing a decimal digit when the sign associated with the preceding binary number was minus, whereby said decimal numbers are expressed in binary-coded, algebraic-quinary form; a pair of storage means connected to said input means for storing the sets of four two-valued signals designating the binary numbers and signs representing respectively related decimal digits of a pair of multidigit operand numbers, and for serially presenting said sets of signals to respective outputs; and arithmetic operator means having respective inputs connected to said storage outputs and including logical means for serially operating on the pairs of binary numbers presented at said outputs, and including transcriber logical circuit means for presenting the result numbers in binary-coded, algebraic-quinary form.

4. A digital computer comprising input means including means for representing each of the decimal digits 0 through 5 as a set of four two-valued signals designating the corresponding three-digit binary numbers 0 through 5, respectively, and a plus sign, and for representing each of the decimal digits 6 through 9, respectively, as a set of four two-valued signals designating the three-digit binary number which is the ten's complement of such decimal digit and a minus sign, and means for adding unity to the three-digit binary number representing a decimal digit when the sign associated with the preceding binary number was minus, whereby said decimal numbers are expressed in binary-coded algebraic-quinary form; a pair of storage means connected to said input means for storing the sets of four two-valued signals designating the binary numbers and signs representing respectively related decimal digits of a pair of multidigit operand numbers, and for serially presenting said sets of signals to respective outputs; a pair of sign-selectors connected to said respective storage outputs and each having a set of positive and a set of negative outputs, and means in each sign selector for passing the three-digit binary number representing the absolute value of a digit to one of said positive and said negative sets of outputs, respectively, depending on the sign associated with said digit; arithmetic operator circuit means having positive and negative inputs connected to the positive and negative outputs of said sign-selectors, respectively, and including logical means for serially and separately operating on the pairs of binary numbers passed to said outputs to provide separate result numbers, and transcriber circuit means for combining said separate result numbers into a common result number in algebraic quinary form.

References Cited in the file of this patent

UNITED STATES PATENTS

| 2,657,856 | Edwards | Nov. 3, 1953 |
| 2,668,661 | Stibitz | Feb. 9, 1954 |
| 2,679,977 | Andrews | June 1, 1954 |
| 2,697,549 | Hobbs | Dec. 21, 1954 |
| 2,787,416 | Hansen | Apr. 2, 1957 |
| 2,919,855 | Trimble | Jan. 5, 1960 |

FOREIGN PATENTS

| 749,836 | Great Britain | June 6, 1954 |